(12) United States Patent
Lerner

(10) Patent No.: US 7,865,613 B2
(45) Date of Patent: *Jan. 4, 2011

(54) METHOD AND APPARATUS FOR INTEGRATING DISTRIBUTED SHARED SERVICES SYSTEM

(75) Inventor: Jack Lawrence Lerner, Oakland, CA (US)

(73) Assignee: Charles Schwab & Co., Inc., San Francisco, CA (US)

( * ) Notice: Subject to any disclaimer, the term of this patent is extended or adjusted under 35 U.S.C. 154(b) by 28 days.

This patent is subject to a terminal disclaimer.

(21) Appl. No.: 12/338,034

(22) Filed: Dec. 18, 2008

(65) Prior Publication Data

US 2009/0100131 A1    Apr. 16, 2009

Related U.S. Application Data

(63) Continuation of application No. 11/195,564, filed on Aug. 2, 2005, now Pat. No. 7,484,001, which is a continuation of application No. 09/750,596, filed on Dec. 28, 2000, now Pat. No. 6,954,799.

(60) Provisional application No. 60/179,584, filed on Feb. 1, 2000.

(51) Int. Cl.
*G06F 15/173*    (2006.01)
*G06F 15/16*    (2006.01)

(52) U.S. Cl. .................. 709/240; 709/217; 709/227
(58) Field of Classification Search ............... 709/217, 709/227, 228, 238, 240
See application file for complete search history.

(56) References Cited

U.S. PATENT DOCUMENTS

| | | | | | |
|---|---|---|---|---|---|
| 5,708,780 | A | * | 1/1998 | Levergood et al. | 709/229 |
| 5,875,296 | A | * | 2/1999 | Shi et al. | 726/5 |
| 5,987,611 | A | * | 11/1999 | Freund | 726/4 |
| 5,999,971 | A | * | 12/1999 | Buckland | 709/218 |
| 6,092,196 | A | * | 7/2000 | Reiche | 726/6 |
| 6,499,052 | B1 | * | 12/2002 | Hoang et al. | 709/203 |
| 6,510,464 | B1 | * | 1/2003 | Grantges et al. | 709/225 |
| 6,523,022 | B1 | * | 2/2003 | Hobbs | 1/1 |
| 6,529,952 | B1 | * | 3/2003 | Blumenau | 709/223 |
| 6,725,269 | B1 | * | 4/2004 | Megiddo | 709/228 |
| 6,836,845 | B1 | * | 12/2004 | Lennie et al. | 713/181 |
| 7,484,001 | B2 | | 1/2009 | Lerner | |

* cited by examiner

*Primary Examiner*—Hussein A Elchanti
(74) *Attorney, Agent, or Firm*—Townsend and Townsend and Crew LLP

(57) ABSTRACT

Method and apparatus for integrating distributed shared services system which integrates web based applications with each other and with other centralized application to provide a single sign-on approach for authentication and authorization services for distributed web sites requiring no access time back to the authentication/authorization server is provided.

12 Claims, 7 Drawing Sheets

METHOD AND APPARATUS FOR INTEGRATING DISTRIBUTED SHARED SERVICES SYSTEM

CROSS-REFERENCE TO RELATED APPLICATIONS

This application is a continuation of and claims priority from U.S. patent application Ser. No. 11/195,564, filed Aug. 2, 2005, entitled Method and Apparatus for Integrating Distributed Shared Services System, which claims priority to U.S. Pat. No. 6,954,799, filed Dec. 28, 2000, entitled Method and Apparatus for Integrating Distributed Shared Services System which claims priority to provisional application No. 60/179,584 titled Method and Apparatus for Integrating Distributed Shared Services System filed on Feb. 1, 2000 under 35 USC §119, and all applications are herein incorporated by reference in their entirety.

BACKGROUND OF THE INVENTION

1. Field of the Invention

The present invention relates to method and apparatus for integrating distributed shared services system. In particular, the present invention relates to method and apparatus for integrating web based applications with each other and with other centralized application which provides a single sign-on approach for authentication and authorization services for distributed web sites and which requires no access time back to the authentication/authorization server.

2. Description of the Related Art

The rising use of the world wide web (the web) for access and distribution of information has prompted many service providers and retailers alike to adopt the internet as a principal information portal for customers and clients. For example, traditional brick and mortar companies are creating and providing their web sites to interface and interact with their customers. This approach is beneficial to both parties alike for many reasons. Some of these reasons include the speed at which the sought information can be transferred to the intended recipient, the cost effective manner in which to provide information compared to, for example, traditional postal systems. In the case of banks, customers can easily log onto the bank's web site and after a login procedure, can access their account information with little or no wait time. Moreover, depending on the speed at which the banks can update the account information, the customers can also retrieve up-to-date account activity information. At the other end, the banks can obtain substantial savings by providing and maintaining their web site for interaction with their customers as opposed to having dedicated customer support personnel properly trained and made available around the clock.

Recognizing the web site and the internet as a principal medium for businesses to interact with their clients and customers, in addition to providing information specific to the client and customer vis a vis the business, the businesses are also expanding their web sites to provide information and access to related businesses or links (for example, by providing hypertext links within their web site linked to a Uniform Resource Locator (URL) of another related business or information provider).

In the case of brokerage firms and investment banks, in addition to the ability to retrieve account information, the customers are likely to be interested in information related to various financial instruments and activities. For example, for a brokerage account holder who has a margin account with approval to trade in option contracts, the account holder is likely to be interested in information related to trading in options such as call and put options, as well as detailed information on how option contracts are created, bought, sold, traded, and the impact of each of such activity. By way of another example, a relatively new brokerage account holder who recently opened a cash account and a 401K account with the brokerage firm may be interested in obtaining information related to the various different types of IRA accounts, basic trading information and relative risks for the various trading techniques, and so on.

While some brokerage firms and investment banks may have the capability to provide such information, with a growing pool of account holders, many firms find it more expedient to initially outsource to outside vendors who already have established practice of providing information and/or service. In this manner, the firms can better attempt to meet the customers' demand for the rapidly increasing and varied types of related information and/or services.

One disadvantage to the outsourcing approach, however, is that in many cases, the users are required to provide login information each time the user logs onto a third party vendor web site. For example, an account holder with C. Schwab & Co., the assignee of the present application, may wish to enroll in an online interactive education courses that are offered through Schwab.com web site but provided by a third party vendor. After initially logging onto schwab.com's web site, the account holder clicks on a hypertext link in schwab.com's web site, and the account holder's web browser is directed to the web site of the third party vendor providing the online interactive education courses. Here, the Schwab account holder must log in once again to register or to resume the course from where it was left of during the last session.

While still within schwab.com's server domain, the account holder is nevertheless required to separately log onto the third party vendor's site. Such user authentication or validation is necessary each time the account holder clicks on a hypertext link to be redirected to another information source. Moreover, once the account holder provides the log-in information to the third party vendor, the third party vendor must access back to the central server at schwab.com to verify the account holder's log-in information or to retrieve any other information related to the account holder that may be relevant to the account holder vis a vis the third party vendor. For example, in the case where the account holder is returning to a previous online interactive education course, once the account holder logs onto the third party vendor site, the server at the third party vendor accesses the central server at schwab.com to confirm that the account holder is indeed a Schwab account holder, and furthermore, to determine where in the interactive course the account holder left off during the last session.

Additionally, the third party vendor may want to retrieve additional information related to the account holder to better tailor the account holder's interactive course. For example, assuming that the online interactive education course provides information on options trading, the third party vendor would find it useful to have the account holder's trading history to determine whether the account holder has traded in option contracts at all, and if so, how often and so on. This type of information is especially useful to effectively design such interactive education course to be suited for each account holder.

As discussed above, irrespective of the type of third party vendors and the application or information provided, a user or an account holder is required to provide login information each time the user wishes to access the third party vendor application from a central server domain such as schwab.com.

SUMMARY OF THE INVENTION

In view of the foregoing, it would be desirable to have an integrated distributed application system and method which require a single sign-on to the central server domain and permits access to other applications whether offered by third party vendors at a remote site or available within the central server.

In accordance with one embodiment of the present invention, there is provided a method of providing a single sign-on distributed application services integration, comprising the steps of: receiving a first indication of a user pointing a browser to a first application; receiving a cookie file of said browser corresponding to the user; updating said cookie file; receiving a second indication of said user pointing said browser to a second application; and providing said updated cookie file to said second application.

In accordance with another embodiment of the present invention, there is provided a system for providing a single sign-on distributed application services integration, comprising: a client terminal; and a central server coupled to said client terminal configured to receive from said client terminal a first indication of a user pointing a browser to a first application and a cookie file of said browser corresponding to the user; wherein said central server is further configured to update said cookie file, and when a second indication of said user pointing said browser to a second application is received from said client terminal, said central server provides said updated cookie file to said second application.

In accordance with yet another embodiment of the present invention, there is provided a method of providing distributed application services integration, comprising the steps of: detecting a user event; generating a message corresponding to the detected user event; and providing said message to one or more applications based on the user event.

In accordance with still yet another embodiment of the present invention, there is provided a system for providing distributed application services integration, comprising: a client terminal; and a central server coupled to said client terminal for detecting a user event at said client terminal; wherein said central server is further configured to generate a message corresponding to the detected user event and to provide said message to one or more applications based on the user event.

These and other features and advantages of the present invention will be understood upon consideration of the following detailed description of the invention and the accompanying drawings.

DETAILED DESCRIPTION OF THE PREFERRED EMBODIMENT

Figure 1:
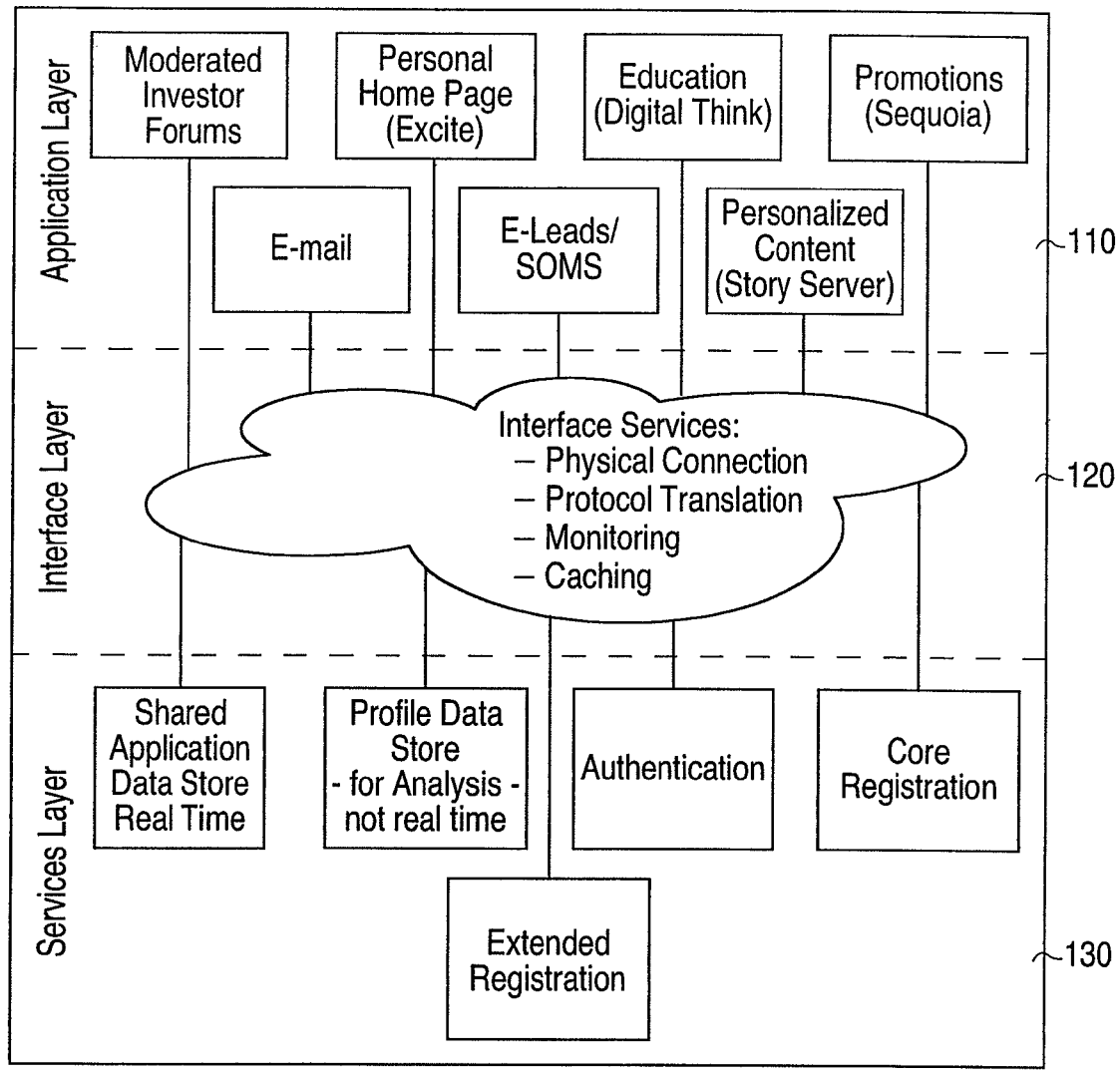
FIG. 1 illustrates an integrated, distributed shared services architecture in accordance with one embodiment of the present invention.

FIG. 1 illustrates an integrated, distributed shared services architecture in accordance with one embodiment of the present invention. As shown, there is provided an application layer 110, a services layer 130 and an interface layer 120 which resides between the application layer 110 and the services layer 130. The interface layer 120 is configured to receive requests for services from the various web applications or other central server applications at the application layer 110, and passes the received requests to the corresponding services at the services layer 130 after performing the necessary protocol, formatting and other transformations. The interface layer 120 is further configured to return any required results back to the calling application at the application layer 110 after performing necessary protocol, formatting or other transformations.

As shown in FIG. 1, the applications in the application layer 110 can be configured to reside on a central server's public web site or can be hosted by third party providers such as Excite, DigitalThink, for example. Other examples of applications can include moderated investor forums, personal home page, educational applications, promotions, e-mail, e-leads, and personalized content. As discussed above, the interface layer 120 can be configured to provide the physical connections between the application layer 110 and the services layer 130, protocol translation, monitoring, and cacheing between the application layer 110 and the services layer 130. As further shown in FIG. 1, the services layer 130 can include shared application such as real time data store, data profile such as non-real time data store for analysis, authentication process and registration processes.

In one aspect of the present invention, the applications from the central server's secure site can be configured to particulate in the architecture shown in FIG. 1. In this case, the interface layer 120 can be configured to permit the applications to access the available services in the services layer 130 such as registration, authentication, and information access. Additionally, it is possible to have a given service to be hosted on multiple sites. For example, an authentication service can be hosted on multiple sites to be closer to the applications calling the service, as long as the data necessary to authenticate the users can be replicated across these sites.

To permit proper communication between the applications in the application layer 110 and the services layer 130, in accordance with one aspect of the present invention, an interface adapter may used to facilitate application integration as will be discussed in further detail below. In this manner, geographically dispersed and architecturally diverse and potentially changing set of applications can use the integrated, distributed shared services architecture and permit changes to them with the least amount of disruptions and effort.

In accordance with one aspect of the present invention, two key types of data movement are identified. The first type of data movement is configured for small data elements that must be made available to distributed web applications synchronously (i.e., in real time) in order to drive, for example, user authentication and experience. Examples can include a common user identification and/or session keys used for authentication or flags indicating which education courses a user is currently enrolled in to drive the user experience on other web applications.

A second type of data movement includes data of varying size for which near real time movement is sufficient. Examples of this second type of data movement include information related to actions that users take which will drive e-mail or lead packages being generated or which will driver user experience in subsequent sessions, and information about user behavior gathered for purposes of analysis.

While the architecture shown in FIG. 1 presents a common interface layer 120 to applications in the application layer 110 for services in the services layer 130 requiring both types of data movement, in accordance with the present invention, different approaches may be used for each data movement type as will be explained in further detail below. In this manner, as requirements for data sizes and data movement timing changes over time, the applications do not have to be altered to accommodate these changes.

Figure 2:
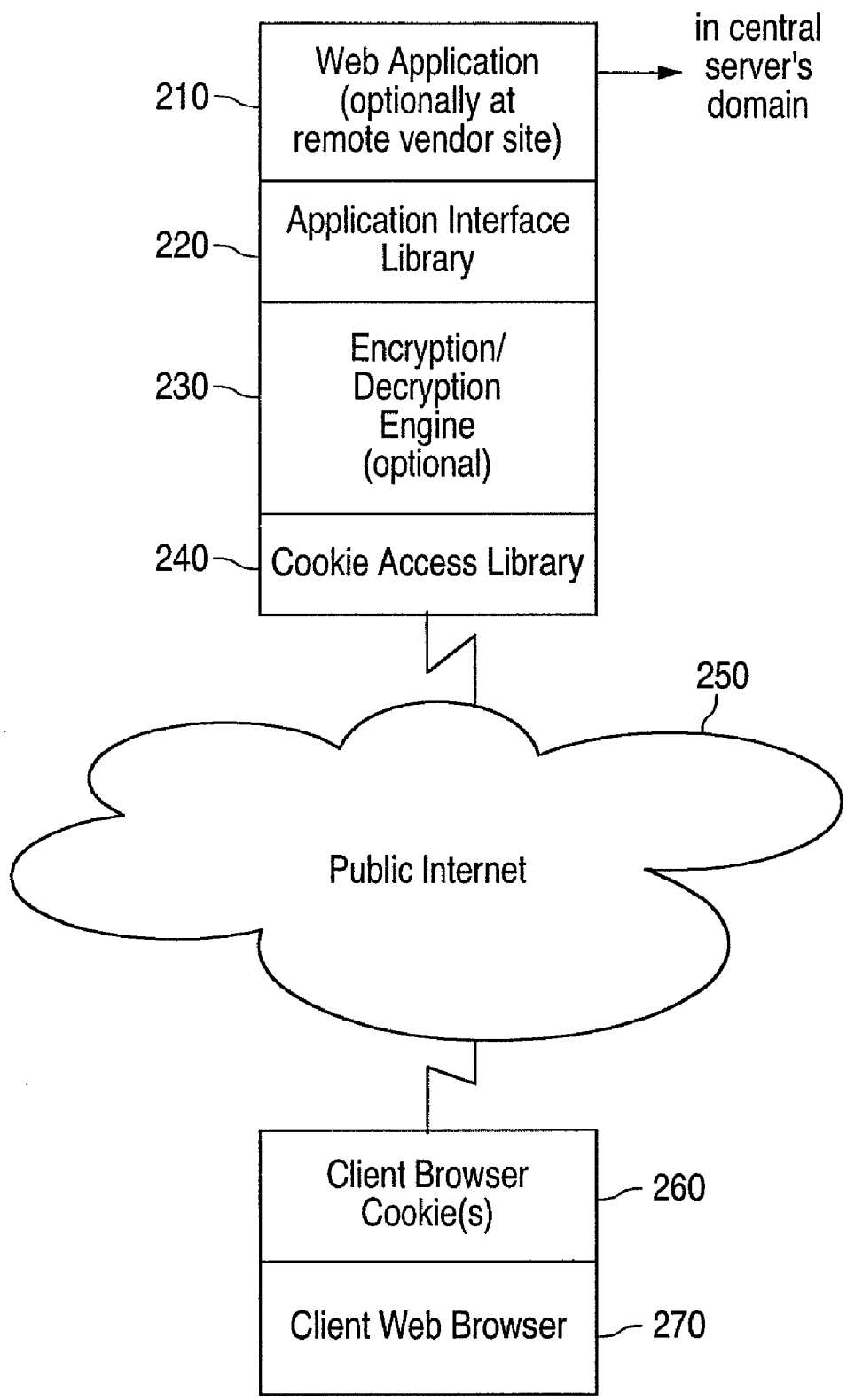
FIG. 2 illustrates a cookie based architecture for providing an integrated, distributed shared services system in accordance with one embodiment of the present invention.

FIG. 2 illustrates a cookie based architecture for providing an integrated, distributed shared services system in accordance with one embodiment of the present invention. As shown, in a central server's web domain, there is provided a web application 210 which may optionally reside at a remote vendor (third party)'s site, an application interface library 220, an optional encryption/decryption engine 230 and a cookie access library 240. The client terminal including client web browser 270 and client browser cookies 260 are connected to the web application 210 residing in central server's domain via the internet 250. As mentioned above, the client terminal which can be in the form of a personal computer, a stand-alone internet access terminal and so on, is provided with a client browser cookie layer 260 and a client web browser 270 which resides at the terminal in the client side.

The web application 210 includes new or existing web application which may be located at the central server terminal or at a remote side, and resides in the central server's internet domain (e.g., schwab.com) in order to share information and data with other applications in the same domain. The application interface library 220 is a common library provided to all web applications for accessing shared services. The application interface library 220 is configured to expose high level functions or methods to the application such as, for example, posting events, requesting data, authenticating users. In the event that the data for transmission contains sensitive information, the encryption/decryption engine 230 provides encryption and decryption functions for the cookie files containing sensitive data. In one aspect of the invention, the encryption/decryption engine 230 may be omitted for systems where sensitive data is not included in the cookie files accessed by the application. Finally, the cookie access library 240 is configured to provide services for reading or writing specified data to cookie files.

At the client terminal, the client browser cookie files 260 can be configured to be relatively small arbitrary strings of data stored by a client's (user's) web browser that may be read and written by all web servers in a given central domain such as schwab.com. Moreover, the client web browser 270 can be any available web browser such as Internet Explorer or Netscape Navigator.

The cookie based architecture shown in FIG. 2 is configured to share small data fragments in real-time between web applications. Small data segments can range from several hundred bytes (characters) but are typically in the lower end of this scale. The entire data segment collection is generally no larger than 1 KB, but can be configured to hold a significant amount of state information. Typically, the entire cookie file would be no more than one to two hundred bytes. These cookies are written, read and modified by the application interface library 220 resident on each affiliated web server, whether local to the central server or residing in a remote partner's site using standard HTTP calls.

As shown in FIG. 2, the cookie based architecture is configured to provide sharing of small amounts of data among web applications in a real-time, synchronous fashion such that the browser cookie files are passed over the internet from one application to another by means of browser redirects. The browser cookies are arbitrary strings of data up to 4 KB each, which may be placed on a user's system by a web server. Any web application in the same central server domain name (e.g., schwab.com) may subsequently read the cookie when the browser is directed to (i.e., requests) a web page, a CGI script or a java servlet located on that server. A browser redirect is an instruction a web browser receives from a web server it has requested a resource (such as a web page, a CGI script, or a java servlet) from directing it to another resource on the same or a different server. Additionally, as discussed above, cookie files containing sensitive data may be encrypted. In this manner, small amounts of user information can be stored and moved from one server to another for authentication process in the distributed systems, for example and encrypted and/or decrypted as necessary.

In one aspect of the present invention, a client or a user at a client terminal points the client web browser 270 at a particular resource (page, CGI, script, etc) that is part of the web application and which generates a need to make information about that event available to other web applications in real time. The cookie files for the server's central domain are then automatically passed from the client web browser 270 to the web application 210. The web application 210 then calls an application interface library function from the application interface library 220 to make the needed information available. The type of information to be shared and the data specific to this particular event or instance is then passed to the function as a parameter in the form of one or more NAME=VALUE pairs. The function calls cookie access library functions from the cookie access library 240 to read the current data in the cookie. Moreover, if necessary, the cookie is encrypted by the encryption/decryption engine 230.

The cookie access library 240 then writes the data in the cookie file back to the client web browser 270 via the internet 250. The client subsequently points the client web browser 270 to a resource that is part of a different web application on a different site but still within the central server's domain that needs the information generated by the client's activity in the previous web application. The new web application then calls the application interface library function from the application interface library 220 to request the desired information using the name part of the NAME=VALUE pair used to store the data initially. The application interface library function then calls cookie access library functions from the cookie access library 240 to read the data in the cookie, and if the cookie to be read is encrypted, the cookie is first decrypted by the encryption/decryption engine 230. The application is now configured to perform specific action based on the value returned.

In accordance with one aspect of the present invention, the types of data that may be shared in the system shown in FIG. 2 include, for example, a unique user identification (ID) provided by the registration/authentication service and used by each we application to uniquely identify each logged in user, and a unique identifier for visitors who have never logged in but whose behavior can be tracked for purposes of marketing analysis, personalization of content and promotions, to name a few. Additionally, data flags indicating market segments of customers or prospective clients such as, for example, Signature Services, Schwab One, IRA, International, current prospects, currently enrolled or having completed certain interactive education courses, or recently posted messages to certain message boards or participated in certain forums.

Figure 3:
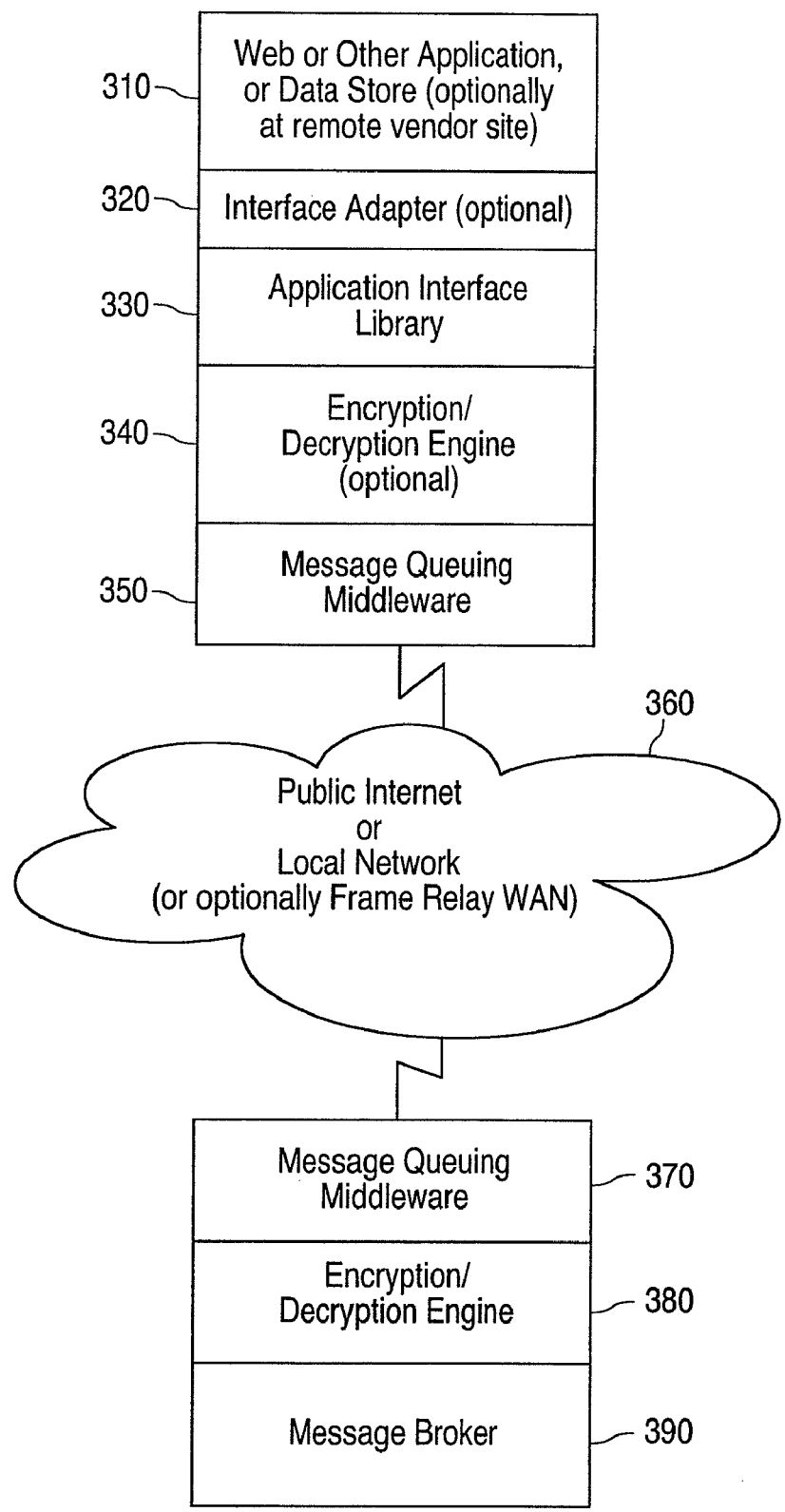
FIG. 3 illustrates a messenger based architecture for providing an integrated, distributed shared services system in accordance with one embodiment of the present invention.

FIG. 3 illustrates a messenger based architecture for providing an integrated, distributed shared services system in accordance with one embodiment of the present invention. As shown, in a central web domain, there are provided an application or data store 310, an optional interface adapter 320, an application interface library 330, an optional encryption/decryption engine and a message queuing middleware 350, connected to a client side via the public internet or a local area network (or optionally, to a frame relay wide area network WAN). As further shown, the server terminal is provided with a message queuing middleware 370, an encryption/decryption engine 380 and a message broker 390.

Similar to the architecture shown in FIG. 2, the application 310 of FIG. 3 may be a new or an existing web application at a central server or a remote vendor (third party)'s site, or alternatively, may include other central server or a partner application or database such as LEADS, E-mail, MatchLogic, to name a few. The application interface library 330 is similar to the application interface library 220 of FIG. 2 and is a common library for accessing shared services. In contrast to the application interface library 220 of FIG. 2, however, the application interface library 320 of FIG. 3 may include or call an interface adapter 320 which is configured to directly access application system components such as databases or memory locations.

Moreover, similar to the embodiment of FIG. 2, the encryption/decryption engine 340 is provided to encrypt and decrypt data and may be omitted for bypassed if the data does not contain sensitive information. The message queuing middleware 350 is configured to package data into messages and assure their delivery, even over unreliable transport media such as the internet. In the case where assured delivery is not required, the queuing portion of the operation shown in FIG. 3 may be omitted and only the message packaging function may be used. This approach may be result in improved performance or reduced operational burdens on other servers.

At the central server terminal, as shown in FIG. 3, there is provided the message queuing middleware 370 similar in operation and function to the message queuing middleware 350. Similarly, the encryption/decryption engine 380 is configured to encrypt and decrypt data as with the encryption/decryption engine 340. The message broker 390 is configured to provide message routing and transformation services, permitting cross-application logic to be centrally stored and managed at the central server terminal.

In the manner described above, in accordance with another aspect of the present invention, arbitrary volumes of data that can be shared asynchronously in near real time can be reliably and securely transported over the internet, which may be unsecure, using the message queuing middleware. Similar to the cookie based architecture discussed above in conjunction with the embodiment shown in FIG. 2, in the message broker based architecture of FIG. 3, data is read from and written to the message queues by the application interface library 330 which resides on (or network-wise near) the web application or other third party server that needs to share or access the data. Additionally, as discussed above, the interface adapter 320 may optionally interact directly with the application system components such as databases or memory regions as needed on behalf of the application interface library 330.

Moreover, the message broker based architecture shown in FIG. 3 contains a message broker component which provides message routing and transformation services in the "hub" of the "hub and spoke" arrangement. In this manner, an event from an application 310 on a remote server in a central domain may cause changes to multiple other applications in the central domain, each of which needs that event presented to it in a distinct format.

For example, when a user or a client who enrolls in an advanced options trading course on the interactive education application on a remote vendor's (third party to the main central server) site within the central server domain, as with most course enrollments, a welcome e-mail is caused to be generated from the e-mail channel to be sent to the user. Additionally, considering the case where options trading course enrollees have been targeted for personal follow ups via the SOMS application, all other we applications need to know when a person has enrolled in the advanced options trading course so that contents such as banners specifically designed for this type of potential investor may be delivered to them instead of only those generic or randomly selected content. Additionally, the marketing datamart may need to be informed so that the efficacy of the targeted banners with respect to this type of users can be tracked.

The types of data sharing discussed above should be initiated by the original web application 310 by simply posting the event via the application interface library 330, or alternatively, via an interface adapter 320 which is configured to monitor the changes to predetermined tables or values in the internal database. The application interface library 330 formats the message and places it in a queue for transmission over the internet even if communication is temporarily disrupted. Additionally, the message can optionally be encrypted by the encryption/decryption engine 340 before the transmission to preserve the security of the message being transmitted.

The message broker 390 at the central server receives the message transmitted from the web application 310 and determines, based on the content of the message, which other applications or data stores in the central server domain need to receive it. The message broker 390 further performs any necessary data translation such that the message is compatible to those applications or data stores that are to receive the message, and thus make of the data contained in the transmitted message. Alternatively, the message broker 390 may directly communicate with local applications or data stores residing in the central server terminal, or may encrypt and queue messages as needed to transmit the messages to remote locations over a public data network such as the internet.

Accordingly, in accordance with one embodiment of the present invention, when a user event of interest occurs on a web or other application 310, the application 310 calls a function in the application interface library 330 to notify the "system" of the occurrence of the event. The application 310 then passes one or more NAME=VALUE pairs as parameters to indicate the type of event that has occurred and the relevant data related to the event. Alternatively, the interface adapter 320 directly detects the occurrence of the event by monitoring the internal database (which can be a system file or a memory location) of the application 310 and calls the application interface library 330 for the appropriate function. The application interface library 330 then calls the message queuing middleware 350 to package the data for transmission to the message broker 390. If necessary, the message is first encrypted by the encryption/decryption engine 340. In the case where assured delivery is not necessary, the queuing portion of the message queuing middleware 350 may be disabled for the message; otherwise the message is queued up for delivery as soon as the communication path is open or available. If the transport medium is reliable, local and secure, the message queuing middleware 350 may be bypassed and the application interface library 330 may communicate directly to the message broker 390 or to another application interface library on another application or database.

The message queuing middleware 350 is configured to deliver the message over the internet or a local area network, and when the message is received at the message queuing middleware 360, it is decrypted as necessary by the encryption/decryption engine 380 and delivered to the message broker 390. The message broker 390 reads the received message to determine which other applications or databases connected to it needs to receive the message. The message broker 390 then performs any translations or transformations needed so that the message is in a format compatible to the receiving application or database. The message broker 390 then passes the transformed message to each application that needs the message either directly, or through the message queuing middleware 370, and encrypted by the encryption/decryption engine 380 as necessary.

The receiving applications read the received message through their own copies of the application interface library (and alternatively, through their own interface adapter), decrypting the message as needed with their respective encryption/decryption engine and executing the necessary functions based on the receipt of the notification of the original event.

Figure 4:
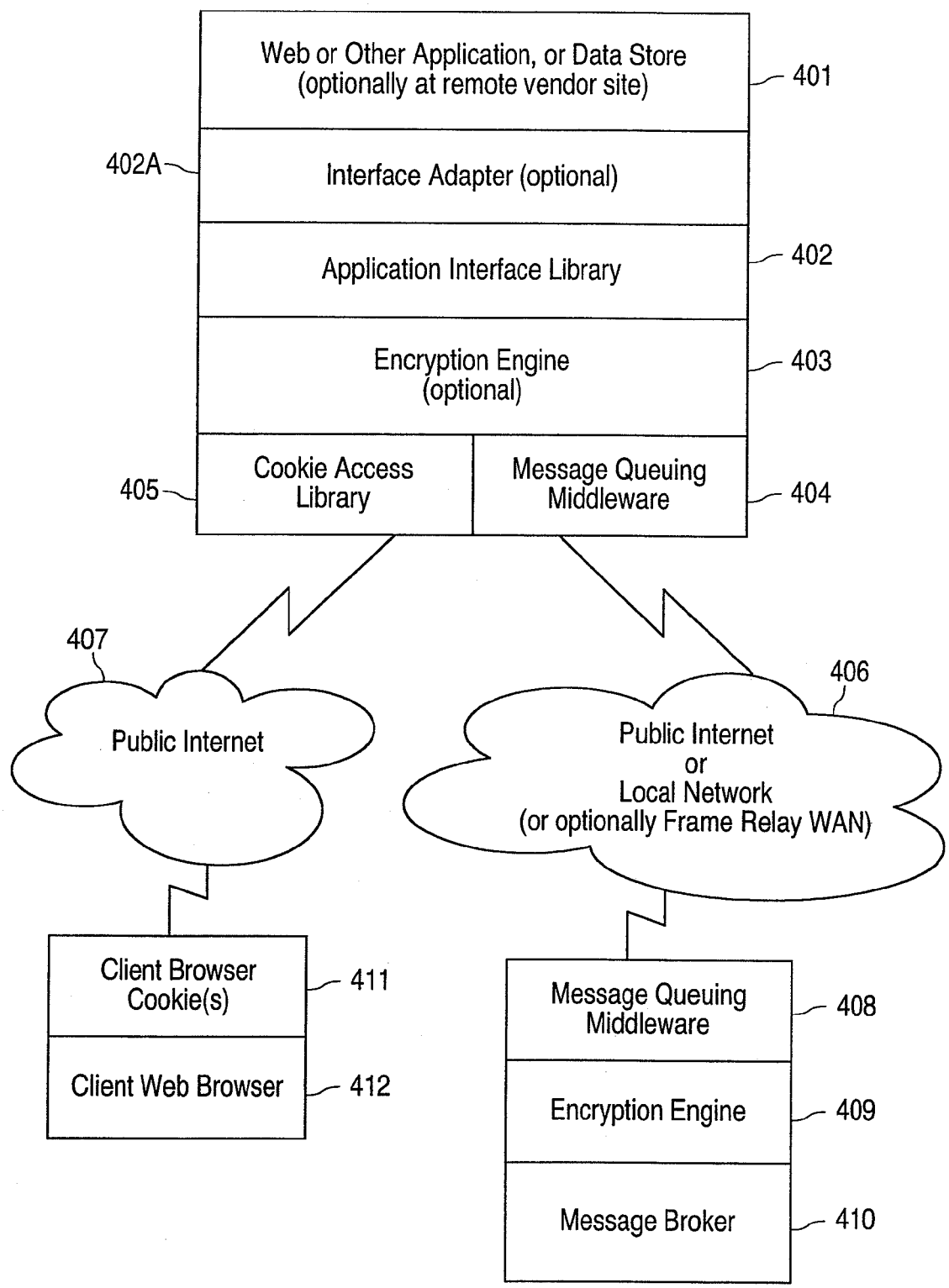
FIG. 4 illustrates a unified architecture for providing an integrated, distributed shared services system in accordance with one embodiment of the present invention.

FIG. 4 illustrates a unified architecture for providing an integrated, distributed shared services system in accordance with one embodiment of the present invention. The operation of each components of the integrated system as shown in FIG. 4 which corresponds to the like components shown in FIGS. 2 and 3 are configured to function in similar manner, and accordingly, the operation and function of each corresponding components shown in FIG. 4 will not be repeated here.

As will be discussed in further detail below, in accordance with one embodiment of the present invention, with a single call from the web application, a single user event on a web site can cause a cookie file to be updated in real time so that information about that event "tracks" the user for the duration of the user's session within the central server domain. Moreover, at the same time, the information related to the event can be passed by a message in near real time to a registration data store such that when the user subsequently directs the user browser to an application, for example, within the central server terminal web site, the application can receive a cookie file with the same data reflecting the most recently updated user event.

In other words, the application interface library 402 for the particular application (optionally residing at a remote third party vendor's site within central server's domain) contains the information to determine whether the user event needs to generate a change to a cookie file, a message to the message broker 410, or to both. In this manner, the application interface library 402 can be modified in accordance with the changes in the requirements without the need to change the calling application.

In one further aspect of the present invention, a configuration file resides on the central web server hosting the web resources to be protected by the system. The contents of the configuration file are updated from a central data store and configuration console program which is configured to push the changes to the various web servers within the central server domain. The push would be performed over the web using the same secure, asynchronous message queuing middleware 404 that is used to send user events from the web servers, but in the opposite direction. In particular, the configuration file contains, for each web server or web application, a list of user events that take place on the server on which actions need to be taken (e.g., messages sent to the message broker 410 and/or cookie files updated) and the details of what actions need to be taken for each type of user event. This information is then used to drive the behavior of the application interface library 402 when a user event takes place.

The configuration file also contains a list of cookie fields that may be read or written by that particular application and whether the application had read access, write access, or both to each of those fields. In this manner, disclosure of sensitive user information to applications that do not need it or are not authorized access thereto can be prevented. Moreover, applications can be prevented from impinging or overlapping with each other by overwriting data in the cookie that does not pertain to the particular application.

Moreover, the configuration file may also be used for the purpose of implementing a key rotation scheme for the keys used to encrypt/decrypt the cookie files and for the different components of the system, remote and central, to authenticate themselves to one another. This is accomplished by pushing to the configuration file, in the same manner as described above, a list of key IDs, each with an expiration time and the key itself. Thus, a login screen program can then provide in the cookie the key ID (for example, in clear text) along with the rest of the data (encrypted with the key identified by the key ID). Thereafter, when the user at the user terminal enters the protected web resource (either at the central server or at a remote third party vendor site within the central server domain), the cookie access library 405 looks up the key in the configuration file (which can be cached in a memory for performance, and encrypted using the server's key for security) using the key ID in the cookie file, and then decrypts the remainder of the cookie data using the key that has been previously pushed to the configuration file. Furthermore, the login screen program would not use a given key until it has verified that the particular key has been successfully uploaded to every web server. Additionally, the login screen program would stop using each key before that key's expiration time has reached. A separate process on the web server would periodically purge expired keys from the configuration file, or this can be performed as part of the update process when new keys are transmitted.

By way of an example, a User Agreement Management function is described. First, consider a case where the User Agreement (UA) for an interactive education application is recently updated from an existing version (ver. 1.8) to a new version (ver. 2.1). A message is then passed to the application interface library 402 by the message broker 410 indicating the change in the version of the User Agreement. The application interface library 402 updates its internal table to reflect the new UA version. The new version of the UA is also passed to the application interface library 402.

A user who has been to the interactive education application before, but has not seen the new version of the UA logs on and receives a cookie which contains a NAME=VALUE pair indicating the version of the UA (ver. 1.8) this user has most recently viewed (e.g., IAEDUA=1.8). The user clicks on a link to go to the interactive education application, passing the cookie to this application. The interactive education application then calls a function in the application interface library 402 to compare the last version of the UA viewed by the user (for example, from their cookie) to the latest version of the UA stored in the application interface library 402 (i.e., ver. 2.1). Having determined that the two version do not match, the application interface library 402 displays the new UA to the user and accepts the user's acknowledgment when the user views the new UA displayed. The application interface library 402 then updates the user's cookie with the NAME=VALUE pair (e.g., IAEDUA=2.1) and passes the same information to a registration database at the central server (e.g., schwab.com).

When the user clicks out of the interactive education application, but returns in the same session to the interactive education application, since the cookie was updated to indicate that the user has seen the latest version of the UA, the new version of the UA (i.e., ver. 2.1) are not presented to the user for viewing. Subsequently, when the user logs on in a different session, the user is given a cookie file with the updated information from the central server's registration database (e.g., from the schwab.com registration database). At this time, when the user goes to the interactive education application, the application interface library 402 compares the updated information in the cookie to the latest version of the UA, and determining that the two versions of the UA match, the user is not presented with the UA for viewing again.

Figure 5:
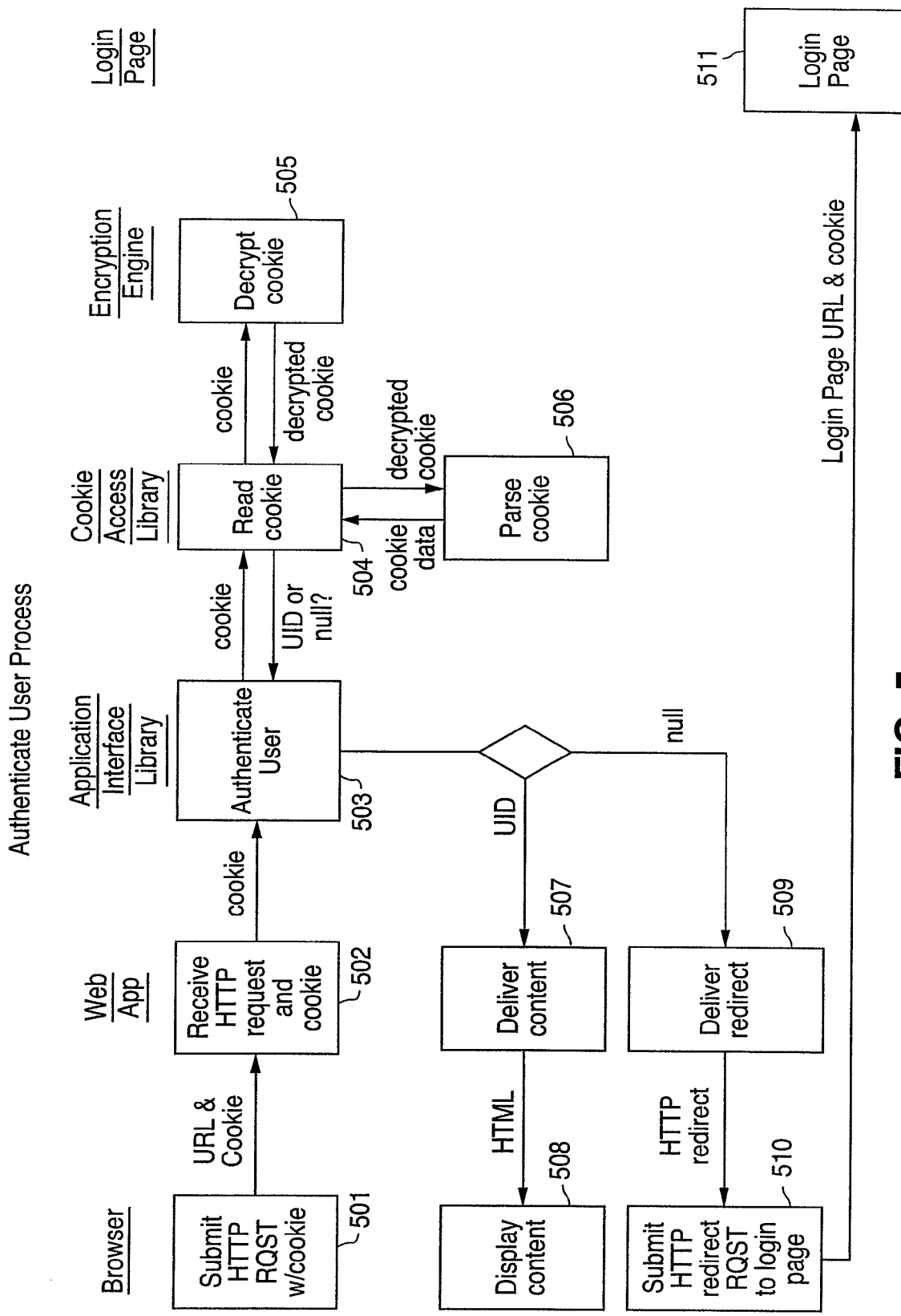
FIG. 5 illustrates a flowchart for a user authentication process in accordance with one embodiment of the present invention.

FIG. 5 illustrates a flowchart for a user authentication process in accordance with one embodiment of the present invention. As shown, the operation and function of the components of the architecture for providing the integrated, distributed shared services system illustrated in FIG. 4 is further discussed. Accordingly, reference to the components shown in FIG. 4 will be made in conjunction with the operation and function illustrated in FIG. 5.

First, at step 501 the user terminal client web browser 412 submits an HTTP request with a cookie to a web application 401 such that the URL of the desired resource (e.g., application 401) available in the central server domain and the cookie is transmitted to the application 401. Having received the HTTP request and the cookie, at step 502 the application corresponding to the HTTP request (e.g., application 401) transmits the cookie to the application interface library 402. The application interface library 402 at step 503 then performs user authentication processing. In particular, the application interface library 402 transmits the cookie received from the client web browser 412 to the cookie access library 405 which is configured to read the cookie data at step 504. In the event that the transmitted cookie is encrypted, the cookie access library 405 transmits the encrypted cookie to the encryption/decryption engine 403 which, at step 505 decrypts the encrypted cookie and passes the decrypted cookie back to the cookie access library 405. The cookie access library 405 then parses the decrypted cookie at step 506 into cookie data and accordingly, determines whether the user ID is matched or not by returning a confirm authentication or a null match command to the application interface library 402. With a matched user ID, the application interface library 402 returns the result to the web application 401 which then delivers the application content at step 507 for display at the client browser 412 at step 508. On the other hand, if the authentication process is unsuccessful, a null match command is returned to the web application 401 which then delivers redirect information with a HTTP redirect to the client web browser 412 at step 509. The client web browser 412 then submits the HTTP redirect request to the login page of the application at step 510, and the login page URL and the cookie is sent to the login page at the client web browser 412 at step 511 where the user is prompted to input login information to access the desired application.

Figure 6:
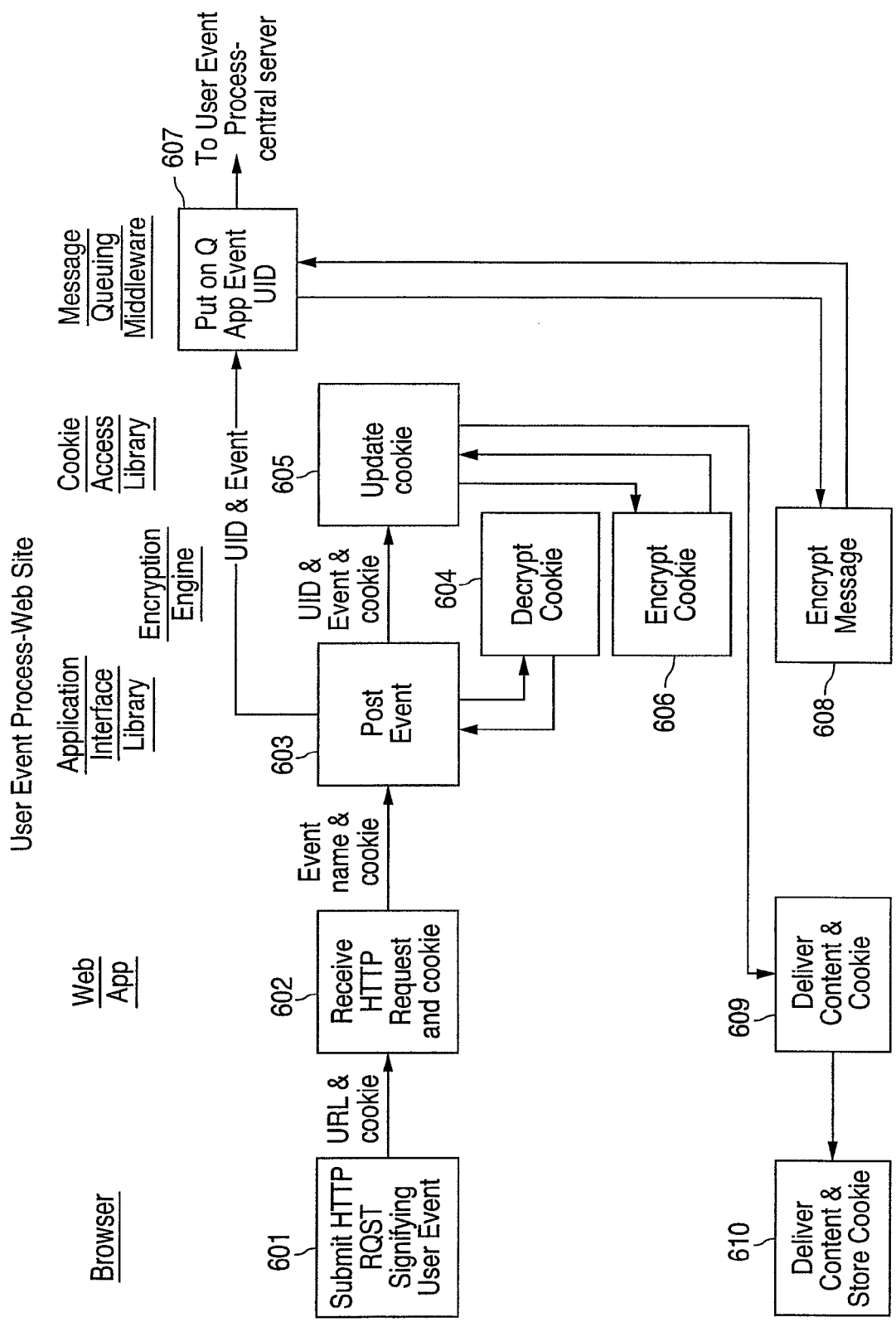
FIG. 6 illustrates a flowchart for a user event processing of a web site in accordance with one embodiment of the present invention.

FIG. 6 illustrates a flowchart for a user event processing procedure to access a desired application in accordance with one embodiment of the present invention. As shown, when a user event occurs such as when a user/client requests access to a particular application or resource in the central server domain, at step 601 the user at the user terminal web browser 412 submits an HTTP request corresponding to the requested application or resource, transmitting the corresponding URL and the cookie file. At step 602, the corresponding web application 401 receives the HTTP request and the cookie file, and in turn, passes the event name and the received cookie to the application interface library 402 which posts the corresponding event at step 603. In other words, at step 603, the requested application or data store from the application interface library 402 places the message signifying the user event onto either a browser cookie or a message queue for eventual delivery at step 607 to another (or subsequent) data store or application. Again, the application, event and the user ID in the form of a message can be optionally encrypted at step 608 by the encryption engine 409 when they are placed onto the message queue before being transmitted from the message queuing middleware 404 of the application or data store resident locally at the central server or at a third party vendor site within the central server domain.

As discussed previously, the application interface library 402 optionally passes the cookie at step 604 to the encryption/decryption engine 403 as necessary to decrypt the cookie in the event that the received cookie is encrypted. Furthermore, the application interface library 402 passes the user ID, the corresponding event and the cookie to the cookie access library 405 which is configured to update the received cookie at step 605, and as necessary, encrypt the cookie by passing the updated cookie to the encryption/decryption engine 403 at step 606. The updated cookie (optionally encrypted) and the event content is then passed to the user specified web application 401 at step 609 and thereafter, at step 610, the content corresponding to the user specified web application 401 is displayed on the client browser 412 at the client terminal.

Figure 7:
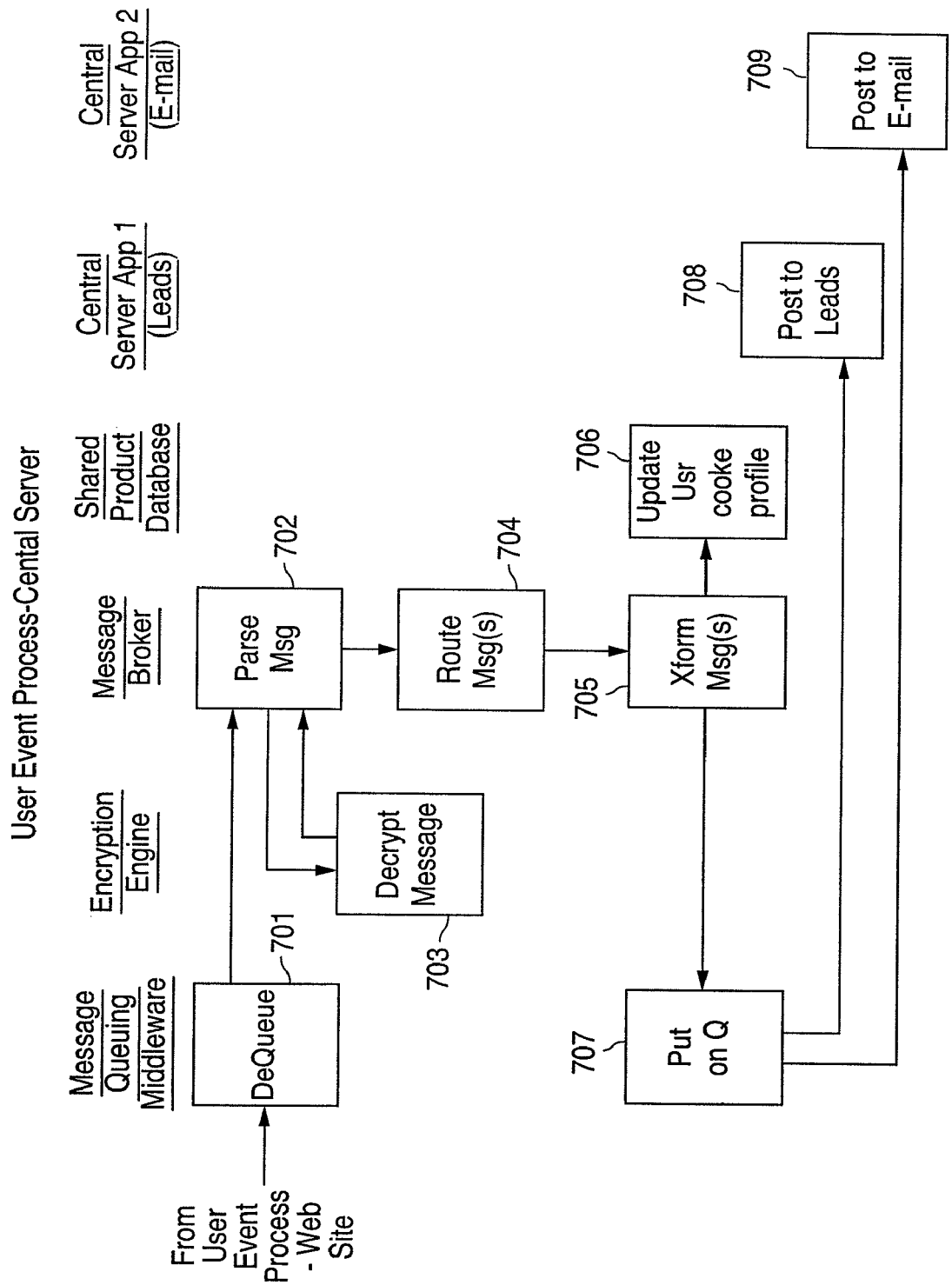
FIG. 7 illustrates a flowchart for a user event processing of a central server in accordance with one embodiment of the present invention.

FIG. 7 illustrates a flowchart for the user event processing procedure at the central server in accordance with one embodiment of the present invention. As shown, at step 701 the message queuing middleware 408 at the central server receives the message which contains information related to the user specified application, user event and user ID from the message queuing middleware 404 and passes the same to the message broker 410 for parsing the message at step 702. Optionally, in the case where the received message is previously encrypted (for example, by the encryption engine 403 at step 608 shown in FIG. 6), the encryption engine 409 at the central server terminal decrypts the message at step 703 and returns the decrypted message to the message broker 410. The message broker 410 routes the parsed, decrypted message at step 704, that is, the message broker 410 determines which applications or data stores, whether local or remote, need to receive the incoming message and routes them accordingly. Thereafter at step 705, the message broker 410 transforms the message for the respective application or data store into the appropriate format suitable and compatible for the intended application or data store determined at step 704.

As further shown in FIG. 7, at step 706, the message broker 410 provides the updated user information from the parsed and optionally decrypted message to the shared product database resident at the central server to update the user cookie profile to reflect the user event based on the message received. Additionally, the message broker 410 places the transformed message on queue with the message queuing middleware 408 at step 707 so that the message can be posted at the appropriate application or data store as shown by steps 708 and 709 in FIG. 7 where the corresponding applications are Leads and e-mail applications, both of which are resident at the central server terminal.

In the manner shown above, the present invention provides and architecture for services and communication infrastructure on which a common, distributed authentication and registration user experience can be built. In particular, information provided by a user at any application can be passed to the central registration repository via the message broker. Thus, when a user logs on, a cookie can be placed on their web browser with this information so the user can "carry" it to every application the user visits during the user's session. Moreover, data in cookies can be encrypted and decrypted with encryption libraries which can be incorporated into the application interface library. Most message oriented middleware products either provide functions to encrypt messages or have hooks for using other encryption products or libraries. In one embodiment, the same encryption library can be used for both message and cookies. Moreover, encryption libraries can be called from the application interface library to encrypt data before the data is placed in a message or a cookie to ensure data security.

As discussed above, data that directly drives the user experience in real time can be placed in browser cookies, thus minimizing user experience performance during each session. Moreover, when there is no network connection problems, even the near real time message passing architecture has a typical end to end latency of only a few seconds, thus maximizing user experience during each user session.

Furthermore, the architecture in accordance with the present invention provides a vehicle for different user registration and authentication components to operate together. This feature is invaluable in integrating public web sites and secure site registration authentication and registration, as well as in integrating any outsourced registration/authentication with in house components. With respect to the web applications, any application that can call a library and be location in the central server domain will be able to use the shared services for its registration and authentication. Indeed, the cookie-based authentication allows a user to log in once and move from application to application without the need for re-authentication. Additionally, user behavior and user provided information can be passed to a central user profile repository using the message passing portion of the architecture. The relevant profile can then be placed in the user's browser cookie at the time of user login process. Thus, each application can read the cookie and use it to shape banners, prompts and other content based on the user behavior and provided information.

Alternatively, the user behavior information and user provided data can be passed to other central server application and data stores such as E-Leads, SOMS, and the Email channel. Additionally, with the message broker, the application can simply post a message related to the relevant event. Then, the message broker can determine to which applications and data stores that information should be passed, and further, perform any needed format changes to accommodate for the differences between the sending and receiving applications or data stores.

As discussed, the architecture in accordance with the present invention provides a common vehicle for passing data from web applications to any data warehouse, datamart or other repository designed for this purpose. Also, the message broker architecture relieves the web applications of creating separate communications for this purpose by simply posting the relevant event and the message broker determines whether to send the information to the repository, other central server applications or data stores, or any combination thereof with any necessary modification and transformation to the format to provide compatibility.

By locating the message routing function in the central server message broker, the architecture in accordance with the present invention permits services and applications to be added or modified as requirements evolve. Additionally, as discussed above, passing a cookie with a reasonably small amount of data produces negligible impact on the response time for the users, and ensures that the data is available to the application at the time the user accesses it.

Moreover, the application interface library exposes functions to allow an application to request data (request/response), send and forget messages with assured delivery and event notification with intelligent routing with the message broker. Operating in conjunction with the interface adapter, the application interface library can supply data directly to the application via an exposed API or by directly performing operations on its database through a push operation. Indeed, the application interface library is intended to have a small footprint and be readily accessible to applications in a wide variety of environments. Where additionally flexibility is required, the interface adapters can be configured to monitor and interact with applications and their data stores, often with no changes to the application, thus providing a non-invasive architecture.

Furthermore, the application interface library and the cookie based portion of the architecture can be deployed on multiple web servers set up for automatic rollover. Leading message brokers and message oriented middleware products can also be set up with multiple servers or multiple queues designed to failover automatically in the event of planned downtime or unanticipated system failure. Since the underlying data transport is the internet, if a user can access an application from client terminal browser, the user access can also pass data to the application via its cookies. The message queuing middleware is designed to hold onto data in the event of a network failure, and to resume transmission automatically when the connection is restored.

Finally, the architecture of the present invention is specifically designed to allow components to be bypassed or omitted when their functionality is not required. Messages can be passed without queuing them if assured delivery is not required, and encryption can be bypassed if the underlying data is not sensitive, and the message broker can be bypassed where local applications area already capable of communicating to one another and interface adapters need not be deployed where the application interface library suffices. Moreover, alternatively, the cookie based architecture and the message broker based portion cab be deployed separately, and later combined for greater functionality.

Various other modifications and alterations in the structure and method of operation of this invention will be apparent to those skilled in the art without departing from the scope and spirit of the invention. Although the invention has been described in connection with specific preferred embodiments, it should be understood that the invention as claimed should not be unduly limited to such specific embodiments. It is intended that the following claims define the scope of the present invention and that structures and method within the scope of these claims and their equivalents be covered thereby.

What is claimed is:

1. A method of providing a distributed application services integration system, the method comprising the steps of:
 providing a configuration file which resides in a central server, the configuration file containing a list of cookie fields that may be read, or written to, by a first application or a second application;
 receiving a first indication of a user pointing a browser to the first application residing in the central server, the browser residing in a client terminal;
 receiving a cookie file of the browser corresponding to the user;
 providing the first application with read and write access to the cookie file as determined by the list of cookie fields;
 receiving a second indication of the user pointing the browser to the second application residing in the same domain as the central server; and
 providing the second application with read and write access to the cookie file as determined by the list of cookie fields.

2. The method of claim 1, wherein the first and second applications each includes one or more predetermined resources.

3. The method of claim 1, wherein the predetermined resources include one or more of a web page, a CGI script and a java servlet.

4. The method of claim 1, further comprising:
 comparing the cookie file to one or more of predetermined parameters, wherein the predetermined parameters include a user identification information, a user event access history information, and a user access level information; and
 updating the cookie file based on the comparing step.

5. A method of providing a distributed application services integration system, the method comprising the steps of:
 receiving a first indication of a user pointing a browser to a first application residing in a central server, the browser residing in a client terminal;
 receiving a cookie file of the browser corresponding to the user;
 providing the first application with read and write access to the cookie file;
 receiving a second indication of the user pointing the browser to a second application residing in the same domain as the central server;
 providing the second application with read and write access to the cookie file; and
 providing a configuration file which resides in the central server, the configuration file containing
 a list of cookie fields that may be read, or written to, by a particular application, and
 a list of user events that take place for which the cookie file needs to be updated;
 wherein the providing the first application with read and write access to the cookie file comprises providing the first application with access to a first set of cookie fields of the cookie file as determined by the list of cookie fields, and
 wherein the providing the second application with read and write access to the cookie file comprises providing the second application with access to a second set of cookie fields of the cookie file as determined by the list of cookie fields.

6. A method of providing a distributed application services integration system, the method comprising the steps of:
 receiving a first indication of a user pointing a browser to a first application residing in a central server, the browser residing in a client terminal;
 receiving a cookie file of the browser corresponding to the user;
 providing the first application with read and write access to the cookie file;
 receiving a second indication of the userpointing the browser to a second application residing in the same domain as the central server;
 providing the second application with read and write access to the cookie file;
 providing a configuration file which resides in the central server, the configuration file containing
 a list of cookie fields that may be read, or written to, by a particular application, and
 a list of user events that take place for which the cookie file needs to be updated;
 wherein the providing the first application with read and write access to the cookie file comprises providing the first application with access to a first set of cookie fields of the cookie file as determined by the list of cookie fields, and
 wherein the providing the second application with read and write access to the cookie file comprises providing the second application with access to a second set of cookie fields of the cookie file as determined by the list of cookie fields,
 wherein the cookie file is encrypted, the method further comprising
 pushing to the configuration file a list of key IDs;
 receiving a first key ID along with the cookie file;
 looking up the first key ID in the configuration file;
 decrypting the cookie file using the first key ID; and
 purging expired key IDs from the list of Key IDs.

7. The method of claim 6, further comprising verifying that the first key ID has been successfully uploaded.

8. A method of providing a distributed application services integration system, the method comprising the steps of:
 providing, to a central server, an application which transmits user event data to an application interface library residing in the central server;
 providing, to the central server, a configuration file containing a list of cookie fields that may be read, or written to, by the application,
 wherein the application interface library determines whether the user event data is a first type of event data which requires real time communication to other applications of the system as provided by a change to a field in a cookie file as determined by the list of cookie fields, the cookie file residing in a client terminal, and the application interface library determines whether the user event data is a second type of event data which does not require real time communication to other applications of the system;
 updating the field in the cookie file where the user event data is determined to be a first type of event data; and
 transmitting the user event data as a message where the user event data is deteimined to be a second type of event data.

9. The method of claim 8, wherein the message is transmitted through a queue of a message queuing middleware residing in the central server.

10. The method of claim 9, further including:
encrypting the user event data where the user event data is determined to be the second type of event data, prior to transmitting the user event data as a message through the queue of the message queuing middleware.

11. The method of claim 8, wherein the first type of event data includes user identification and further wherein the second type of event data includes data to be sent by e-mail.

12. The method of claim 8, wherein a message broker, residing in the same domain as the central server, receives the message and determines, based on the content of the message, which other applications or data stores in the central server domain need to receive it.

* * * * *